United States Patent [19]
Ogiso et al.

[11] Patent Number: 5,659,039
[45] Date of Patent: Aug. 19, 1997

[54] QUINOPHTHALONE COMPOUNDS

[75] Inventors: Akira Ogiso, Ohmuta; Rihoko Imai, Tokyo; Tsutami Misawa, Yokohama; Ryu Oi, Yokohama; Yoriaki Matsuzaki, Yokohama; Hisato Itoh, Ohmuta, all of Japan

[73] Assignee: Mitsui Toatsu Chemicals, Inc., Tokyo, Japan

[21] Appl. No.: 393,426

[22] Filed: Feb. 23, 1995

[30] Foreign Application Priority Data

Feb. 25, 1994 [JP] Japan .................................. 6-027731

[51] Int. Cl.⁶ ............................................... C07D 401/14
[52] U.S. Cl. .......................... 546/153; 546/154; 544/336; 544/363
[58] Field of Search .......................... 546/153, 154; 544/363, 336

[56] References Cited

U.S. PATENT DOCUMENTS

| | | | |
|---|---|---|---|
| 3,972,885 | 8/1976 | Kimura et al. | 546/154 |
| 4,324,455 | 4/1982 | Imahori et al. | 350/349 |
| 4,842,781 | 6/1989 | Nishizawa et al. | 264/13 |
| 5,059,356 | 10/1991 | Nakamura et al. | 252/585 |

FOREIGN PATENT DOCUMENTS

| | | |
|---|---|---|
| 198082 | 10/1986 | European Pat. Off. . |
| 62-270664 | 11/1987 | Japan . |
| 63-49705 | 3/1988 | Japan . |

OTHER PUBLICATIONS

Chemical Abstracts, vol. 116, No. 10, Mar. 9, 1992.

Database WPI, Week 8815, AN 88-100839[15], Mar. 2, 1988.

*Primary Examiner*—Jacqueline Haley
*Attorney, Agent, or Firm*—Burns, Doane, Swecker & Mathis

[57] ABSTRACT

Novel quinophthalone compounds, which are represented by the following formula (1):

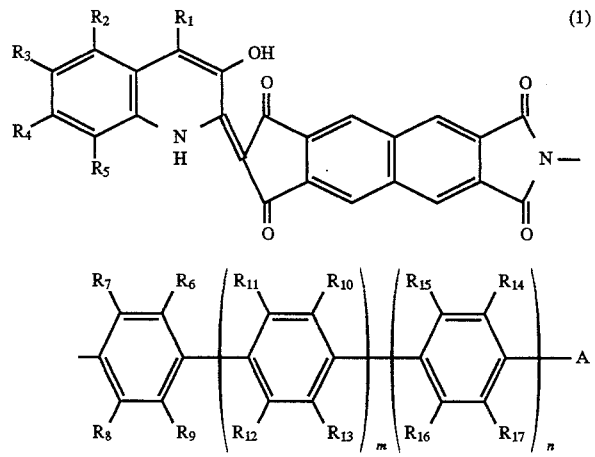

$R_1$–$R_5$ each independently represents a hydrogen or halogen atom or a hydroxy, linear or branched alkyl, substituted or unsubstituted cycloalkyl, halogenated alkyl, alkoxyalkyl, alkoxy, nitro, amino, alkylamino, carboxyl, alkoxycarbonyl, aminocarbonyl, alkylaminocarbonyl, alkylcarbonylamino, alkylcarbonyloxy or cyano group; $R_6$–$R_{17}$ each independently represents a hydrogen or halogen atom or a hydroxyl, alkyl, halogenated alkyl, alkoxy, nitro, amino, alkylamino, carboxyl, alkoxycarbonyl, aminocarbonyl, alkylaminocarbonyl, alkylcarbonyloxy or cyano group; m and n each stands for 0 or 1; and A represents a substituent, are yellow orange dyestuffs suitable for polarizing films. Polarizing films containing at least one of the compounds in a hydrophobic resin are excellent in polarizing performance, heat-resistant dimensional stability, moist heat resistance and the like and are extremely useful for liquid crystal display devices.

4 Claims, No Drawings

QUINOPHTHALONE COMPOUNDS

BACKGROUND OF THE INVENTION

1. Field of the Invention

This invention relates to quinophthalone compounds and also to polarizing films containing at least one of the compounds oriented in a resin.

2. Description of the Related Art

Polarizing films which are most commonly employed these days are those obtained by using a polyvinyl alcohol resin as a film base material. Polarizing property of the film is provided by iodine compounds or dichroic dyestuffs such as acid dyes or direct dyes having selected structures. Polarizing films of this type are insufficient in durability although they show excellent polarizing performance. Therefore, polarizing films of this type have at least one side with transparent film-like materials (protective films) so that they are provided with durability. In other words, it is practiced to provide a relatively durable multi-layer film; a fragile internal polarizing film (layer) is afforded some durability by protecting both sides with protective films (layers).

Coupled with the expansion of the application field of liquid crystal displays to vehicles, computers, industrial equipment and the like in recent years, there is a strong demand for improvements in the durability, especially, the moisture resistance, weatherability and heat resistance of polarizing films employed as elements. As one method for such improvements, polarizing films using a hydrophobic resin as a base material have been proposed.

As polarizing films, those having a neutral gray color are employed in general. To obtain a polarizing film having a constant absorption in 400–700 nm (the visible range), two or more dichroic dyestuffs, preferably, three or more dichroic dyestuffs which are respectively chosen from red, blue and yellow colors are used in combination. The dichroic dyestuffs of yellow orange color in polarizing films using a hydrophobic resin having durability as a base material, are disclosed in U.S. Pat. No. 4,842,781, but they are insufficient in polarizing performance. Moreover, the quinophthalone dyestuffs are disclosed in U.S. Pat. No. 5,059,356, Japanese Patent Laid-Open No. 27066/1987 or Japanese Patent Laid-Open No. 49705/1988, but they are not fully satisfactory in polarizing property although their durability is fully satisfactory.

Further, conventional quinophthalone compounds for example, the compounds disclosed in U.S. Pat. Nos. 3,972,885, 4,324,455 and 5,059,356, Japanese Patent Laid-Open No. 49705/1988, etc. have an absorption maximum wavelength ($\lambda_{max}$) at 446–467 nm. Quinophthalone compounds having $\lambda_{max}$ on a side longer than the above wavelength were not known.

SUMMARY OF THE INVENTION

An object of the present invention is to provide a quinophthalone compound of a yellow orange color suitable as a dichroic dyestuff for a polarizing film making use of a hydrophobic resin as a film-forming base material.

Another object is to provide a polarizing film containing the compound oriented in the resin.

With the foregoing in view, the present inventors have proceeded with an extensive investigation. This investigation has resulted in the finding of quinophthalone compounds having excellent polarizing performance and superb durability and also having an absorption maximum at 477–478 nm unavailable from conventional quinophthalone compounds. Namely, this invention is concerned with a) a quinophthalone compound represented by the below-described formula (1) and b) a polarizing film having excellent performance due to the inclusion of the dyestuff. The quinophthalone compound according to the present invention includes a compound represented by the formula (1) and its tautomers and is novel. Formula (1) is as follows:

(1)

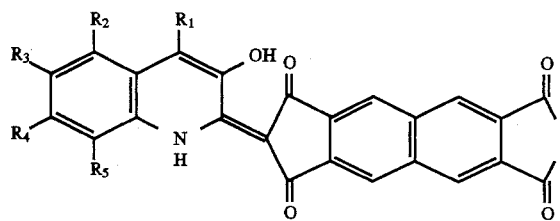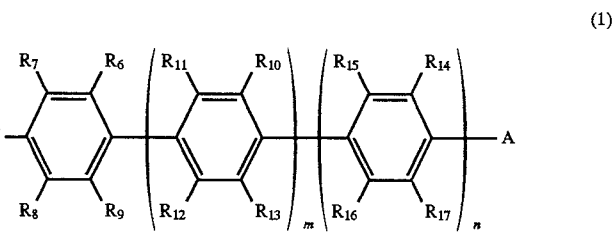

wherein $R_1$–$R_5$ each independently represents a hydrogen or halogen atom or a hydroxy, linear or branched alkyl, substituted or unsubstituted cycloalkyl, halogenated alkyl, alkoxyalkyl, alkoxy, nitro, amino, alkylamino, carboxyl, alkoxycarbonyl, aminocarbonyl, alkylaminocarbonyl, alkylcarbonylamino, alkylcarbonyloxy or cyano group; $R_6$–$R_{17}$ each independently represents a hydrogen or halogen atom or a hydroxyl, alkyl, halogenated alkyl, alkoxy, nitro, amino, alkylamino, carboxyl, alkoxycarbonyl, aminocarbonyl, alkylaminocarbonyl, alkylcarbonyloxy or cyano group; m and n each stands for 0 or 1; and A represents a substituent.

A polarizing film containing the quinophthalone compound according to the present invention is excellent in polarizing performance, heat resistance, moisture resistance and dimensional stability and is useful as a polarizing film for a liquid crystal dis- play.

DETAILED DESCRIPTION OF THE PREFERRED EMBODIMENTS

As a dyestuff for polarizing films, the quinophthalone compound according to the present invention exhibits a high performance that has not been available to date. The chromophoric skeleton of this compound, the 2,3,6,7-tetracarbonylnaphthalene skeleton represented by the formula (3) interacts with polymer chains of the hydrophobic resin so that molecules of the dyestuff are oriented in the resin, resulting in a significant improvement in polarizing performance.

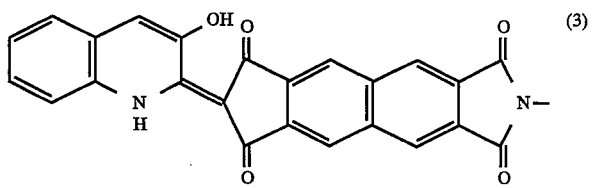

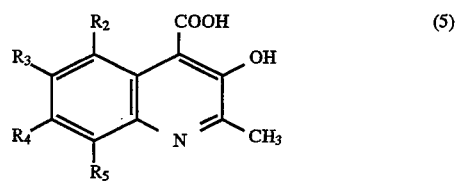

In the above formula (3), tautomers of the quinophthalone compound are represented by the following formulas (4a) to (4d), respectively, and these tautomers may be either in isolated forms or in the form of a mixture of desired proportions.

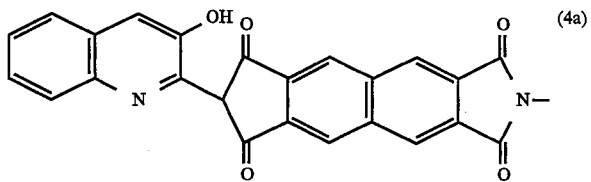

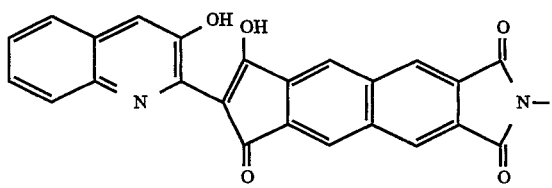

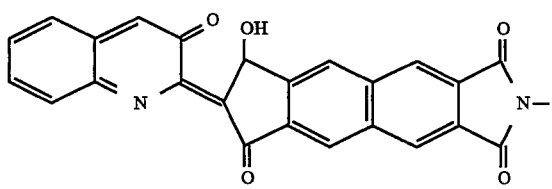

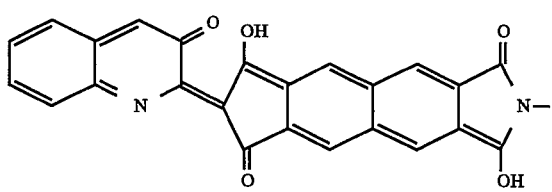

The compound represented by the formula (1) according to the present invention can be prepared in a manner known per se in the art. For example, a compound represented by the formula (6) can be obtained by reacting 2,3,6,7-naphthalenetetracarboxylic dianhydride with a compound represented by the formula (5), preferably in a polar solvent of a high boiling point at 100°–250° C., preferably 150°–240° C., for 1–20 hours, preferably 3–10 hours. Preferred examples of organic solvents for the above reaction include sulfolane, N,N-dimethylacetamide (DMAc) and 1,3-dimethyl-2-imida-zolidinone (DMI).

The compound of the general formula (5) can be synthesized, for example, by the process described in Chemical Society of Japan (compiled), "Encyclopedia of Experimental Chemistry, 4th edition", Vol. 24, 486–493, Maruzen Company Ltd., (1992).

wherein $R_1$–$R_5$ have the same meanings as defined in the formula (1).

Further, the compound represented by the formula (1) can be obtained by reacting the compound represented by the above formula (6) with a compound represented by the formula (7), for example, under heat in an organic solvent as disclosed in Japanese Patent Laid-Open No. 217459/1991. Preferred examples of the organic solvent include N,N-dimethylformamide (DMF), DMAc, DMI and m-cresol. The preferred reaction temperature is 50°–200° C., with 100°–170° C. being more preferred.

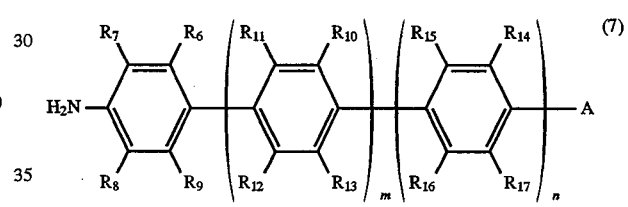

wherein $R_6$–$R_{17}$, m, n and A have the same meaning as defined in the formula (1).

It is to be noted that the substituent represented by $R_1$ in the formula (1) can be introduced by subjecting the compound of the formula (6) or the formula (1) to such a substitution reaction as disclosed in Wegner and Zook (co-editors), "Synthetic Organic Chemistry", John Wiley & Sons, Inc., (1953); Stanley, Karo (co-editors), "Organic Functional Group Preparations", Academic Press, (1983); Harrison & Harrison (co-editors), "Compendium of Organic Synthetic Methods", John Wiley & Sons, Inc., (1971–1988); or Chemical Society of Japan (compiled), "Encyclopedia of Experimental Chemistry", Maruzen Company Ltd., (1978).

For example, the compound of the formula (6) or the formula (1) can be chlorinated, brominated, iodized, nitrated or sulfonated, and the substituent so introduced can then be converted to an alkyl, hydroxyl, halogenated alkyl, alkoxyalkyl, alkoxy, alkylamino, alkylcarbonylamino, alkoxycarbonyl or cyano group. Further, a nitrated compound can be, reduced into an amino compound. Further, a cyano group can be converted to a carboxyl group and this carboxyl group may then be converted into an alkoxycarbonyl, aminocarbonyl or alkylaminocarbonyl group.

Among the compounds represented by the formula (1), the compounds in which (m+n)=1 or 2 are preferred as dyestuffs for polarizing films and those in which (m+n)=1 are suitable.

The quinophthalone dichroic dyestuffs according to the present invention can be represented by the above formula (1). In its substituents $R_1$–$R_5$, fluorine, chlorine, bromine and iodine can be exemplified as halogen atoms. Preferred examples of the linear or branched alkyl group are those having 1–6 carbon atoms, such as methyl, ethyl, n-propyl, isopropyl, n-butyl, sec-butyl, tert-butyl,isobutyl, n-pentyl, isopentyl, 1-methylbutyl, 2-methylbutyl, tertpentyl, neopentyl, 1,2-dimethylpropyl, n-hexyl, 1-methylpentyl, 2-methylpentyl, 3-methylpentyl, isohexyl, 1,2-dimethylbutyl, 1,3-dimethylbutyl and 1,1-diethyl-ethyl.

Illustrative examples of the cycloalkyl group include cyclopentyl, cyclohexyl and the like, which may be substituted by one or more halogen atoms and/or alkyl groups. Exemplary halogenated alkyl groups include fluoromethyl, difluoromethyl, trifluoromethyl, chloromethyl, dichloromethyl, trichloromethyl, pentafluoroethyl and 2,2,2-trichloroethyl.

Preferred examples of the alkoxy group are those having 1–6 carbon atoms, such as methoxy, ethoxy, propoxy, butoxy, pentoxy and hexyloxy. Preferred examples of the alkoxyalkyl group are those having 2–7 car- bon atoms, such as methoxymethyl, methoxyethyl, methoxypropyl, methoxybutyl, methoxypentyl, methoxyhexyl, ethoxymethyl, ethoxyethyl, ethoxypropyl, ethoxybutyl, ethoxypentyl, propoxymethyl, propoxyethyl, propoxypropyl, propoxybutyl, butoxymethyl, butoxyethyl, butoxypropyl, pentoxymethyl, pentoxyethyl and hexyloxymethyl.

Preferred examples of the alkylamino group are those containing 1–6 carbon atoms, such as methylamino, dimethylamino, ethylamino, diethylamino, propylamino, dipropylamino, butylamino, pentylamino and hexylamino. Preferred examples of the alkoxycarbonyl group are those containing 2–7 carbon atoms, such as methoxycarbonyl, ethoxycarbonyl, propoxycarbonyl, butoxycarbonyl, pentoxycarbonyl and hexyloxycarbonyl.

Preferred examples of the alkylamiocarbonyl group are those containing 2–7 carbon atoms, such as methylaminocarbonyl, dimethylaminocarbonyl, N-methyl-N-ethyl-aminocarbonyl, ethylaminocarbonyl, diethylaminocarbonyl, propylaminocarbonyl, dipropylaminocarbonyl, butylaminocarbonyl, pentylaminocarbonyl and hexylaminocarbonyl. Preferred examples of the alkylcarbonylamino group are those containing 2–7 carbon atoms, such as methylcarbonylamino, ethylcarbonylamino, propylcarbonylamino, butylcarbonylamino, pentylcarbonylamino and hexylcarbonylamino. Preferred examples of the alkylcarbonyloxy group are those containing 2–7 carbon atoms, such as methylcarbonyloxy, ethylcarbonyloxy, propylcarbonyloxy, butylcarbonyloxy, pentylcarbonyloxy and hexylcarbonyloxy.

In $R_1$, $R_2$, $R_4$ and $R_5$, each substituent is preferably small. More preferred is a hydrogen atom. In $R_3$, preferred is a hydrogen atom or a linear or branched alkyl, cycloalkyl or halogenated alkyl group. More preferred is a hydrogen atom or a linear or branched $C_{1-5}$ alkyl group.

In $R_6$–$R_{17}$, fluorine, chlorine, bromine and iodine can be exemplified as the halogenatom. Preferred examples of the alkyl group are methyl and ethyl. Illustrative examples of the halogenated alkyl group include fluoromethyl difluoromethyl, trifluoromethyl, chloromethyl, dichloromethyl, trichloromethyl, and pentafluoroethyl.

Preferred examples of the alkoxy group are methoxy and ethoxy. Preferred examples of the alkylamino group are those containing 1–4 carbon atoms, such as methylamino, dimethylamino, ethylamino, diethylamino, propylamino and butylamino. Preferred examples of the alkoxycarbonyl group are methoxycarbonyl and ethoxycarbonyl. Preferred examples of the alkylaminocarbonyl group are those containing 2–5 carbon atoms, such as methylaminocarbonyl, dimethylaminocarbonyl, ethylaminocarbonyl, diethylaminocarbonyl, propylaminocarbonyl and butylaminocarbonyl. Preferred examples of the alkylcarbonyloxy group are methylcarbonyloxy and ethylcarbonyloxy. Here, as $R_6$–$R_{17}$, each substituent is preferably small. More preferred is a hydrogen atom.

Further, the substituent A in the formula (1) can be a hydrogen or halogen atom or a hydroxy, linear or branched alkyl, cycloalkyl, halogenated alkyl, alkoxyalkyl, nitro, amino, alkylaminol, cyano, —$OQ_2$, —$NHQ_3$, —$COOQ_4$, —$NHCOQ_5$, —$OCOQ_6$, —CH=CH—$Q_7$, —C≡C—$Q_8$ or —N=N—$Q_9$ groups or a group represented by one of the following formulas (2a)–(2d):

(2a)

(2b)

(2c)

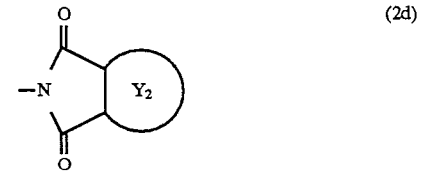
(2d)

wherein $Q_1$–$Q_9$ represent a hydrogen atom or a linear or branched alkyl, substituted or unsubstituted cycloalkyl, or substituted or unsubstituted aryl group; $X_1$ and $X_2$ represent an —O—, —S— or —NH— group; $Y_1$ and $Y_2$ represent a substituted or unsubstituted aromatic ring, substituted or unsubstituted aliphatic ring, or substituted or unsubstituted heterocyclic ring; and $Z_1$ represents a hydrogen atom or a linear or branched alkyl, substituted or unsubstituted cycloalkyl, or substituted or unsubstituted aryl group. The substituent A can be more preferably a group represented by the following formula (2e), (2f) or (2g):

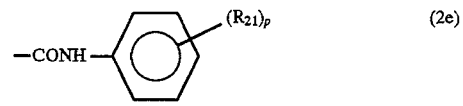
(2e)

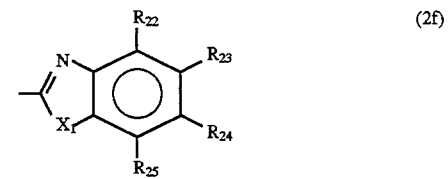
(2f)

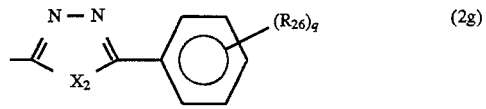
(2g)

wherein $R_{21}$–$R_{26}$ individually represent a hydrogen atom or a linear or branched $C_{1-10}$ alkyl, phenyl or $C_{5-6}$ cycloalkyl group; $R_{22}$ and $R_{23}$, $R_{23}$ and $R_{24}$, and $R_{24}$ and $R_{25}$ may be coupled together to form 6-membered aromatic rings, respectively; p and q stand for 0–3, and $X_1$ and $X_2$ represent an —O—, —S— or —NH— group.

A description will next be made of specific examples of the substituent represented by A in the above formula. As the halogen atom, fluorine, chlorine, bromine and iodine can be exemplified. Preferred examples of the linear or branched alkyl group are those containing 1-20 carbon atoms, such as methyl, ethyl, n-propyl, isopropyl, n-butyl, sec-butyl, tert-butyl, isobutyl, n-pentyl, isopentyl, 1-methylbutyl, 2-methylbutyl, tert-pentyl, neopentyl, 1,2-dimethylpropyl, n-hexyl, 1-methylpentyl, 2-methylpentyl, 3-methylpentyl, isohexyl, 1,2-dimethylbutyl, 1,3-dimethylbutyl, 1,1-diethylethyl, n-heptyl, n-octyl, n-nonyl, n-decyl, n-undecyl, n-dodecyl, n-tridecyl, n-tetradecyl, n-pentadecyl, n-hexadecyl, n-heptadecyl, n-octadecyl, n-nonadecyl and n-eicosyl.

The cycloalkyl group is preferably a substituted or unsubstituted cyclopentyl or cyclohexyl group, more preferably a substituted or unsubstituted cyclohexyl group. Specific illustrative examples include 2-chlorocyclohexyl, 3-chlorocyclohexyl, 4-chlorocyclohexyl, 2-methylcyclohexyl, 3-methylcyclohexyl, 4-methylcyclohexyl, 4-ethylcyclohexyl, 4-n-propylcyclohexyl, 4-isopropylcyclohexyl, 4-n-butylcyclohexyl, 4-sec-butylcyclohexyl, 4-tert-butylcyclohexyl, 4-isobutylcyclohexyl, 4-n-pentylcyclohexyl, 4-n-hexylcyclohexyl, 4-n-heptylcyclohexyl, 4-n-octylcyclohexyl, 4-n-nonylcyclohexyl, 4-n-decylcyclohexyl, 2-n-methoxycyclohexyl, 3-n-methoxycyclohexyl, 4-n-methoxycyclohexyl, 4-n-ethoxycyclohexyl, 4-n-propoxycyclohexyl, 4-n-butoxycyclohexyl, 4-n-pentoxycyclohexyl, 4-n-hexyloxycyclohexyl, 4-n-heptyloxycyclohexyl, 4-n-octyloxycyclohexyl, 4-n-nonyloxycyclohexyl, 4-n-decyloxycyclohexyl, 2,4-dimethylcyclohexyl, 2,5-dimethylcyclohexyl, 3,5-dimethylcyclohexyl, 2,4-dichlorocyclohexyl, 2,5-dichlorocyclohexyl and 3,5-dichlorocyclohexyl.

Preferred examples of the halogenated alkyl group are those containing 1-6 carbon atoms, such as fluoromethyl, difluoromethyl, trifluoromethyl, chloromethyl, dichloromethyl, trichloromethyl, 2,2,2-trichloroethyl, pentafluoroethyl and heptafluoropropyl. Preferred examples of the alkoxyalkyl group are those containing 2-10 carbon atoms, such as methoxymethyl, methoxyethyl, methoxypropyl, methoxybutyl, methoxypentyl, methoxyhexyl, methoxyheptyl, methoxyoctyl, ethoxymethyl, ethoxyethyl, ethoxypropyl, ethoxybutyl, ethoxypentyl, ethoxyhexyl, ethoxyheptyl, ethoxyoctyl, propoxymethyl, propoxyethyl, butoxymethyl, butoxyethyl, pentoxymethyl, hexyloxymethyl, heptyloxymethyl, octyloxymethyl and nonyloxymethyl. Preferred examples of the alkylamino group are those containing 1-20 carbon atoms, such as methylamino, dimethylamino, ethylamino, diethylamino, propylamino, dipropylamino, butylamino, dibutylamino, pentylamino, hexylamino, heptylamino, octylamino, nonylamino, decylamino, undecylamino, dodecylamino, tridecylamino, tetradecylamino, pentadecylamino, hexadecylamino, heptadecylamino, octadecylamino, nonadecylamino and icosylamino.

In the substituents represented by $Q_1$–$Q_9$, preferred examples of the linear or branched alkyl group are those containing 1-20 carbon atoms. The cycloalkyl group may be substituted by one or more halogen atoms, hydroxyl groups, linear or branched alkyl groups, halogenated alkyl groups, or alkoxy groups or the like, preferably, a substituted or unsubstituted cyclohexyl group. The substituted or unsubstituted aryl group may represent a phenyl, biphenyl, terphenyl, naphthyl or pyridyl group which may be substituted by one or more halogen atoms, hydroxyl groups, linear or branched alkyl groups, halogenated alkyl groups, alkoxyalkyl groups, substituted or unsubstituted cycloalkyl groups, alkoxy groups, aryl groups, aryloxy groups, alkylaminocarbonyl groups, arylamino carbonyl groups or arylazo groups. The substituent $Q_1$–$Q_9$ can be more preferably a substituted or unsubstituted aryl group, and the most preferred is a phenyl group which may be substituted by one or more halogen atoms, hydroxy groups, linear or branched alkyl groups or substituted or unsubstituted cycloalkyl groups.

In the substituent A, the connecting groups $Y_1$ and $Y_2$ are each capable of forming a substituted or unsubstituted ring. Illustrative examples of aromatic rings include benzene, naphthalene, anthracene, phenanthrene, pyrene, anthraquinone, azulene, fluolene, fluolenone and 1,2,3,4-tetrahydronaphthalene. Illustrative examples of aliphatic rings include cyclopentane, cyclohexane and cycloheptane. Illustrative examples of heterocyclic rings include pyridine, pyrazine, pyrimidine, indole, isoindole, quinoline, isoquinoline, purine, acridine, pyrrole, thiophene, furan, benzopyrrole, benzothiophene, benzofuran, benzoxazole, benzothiazole, benzimidazole, benzotriazole, piperidine, piperazine, and compounds represented by the following formulas, respectively:

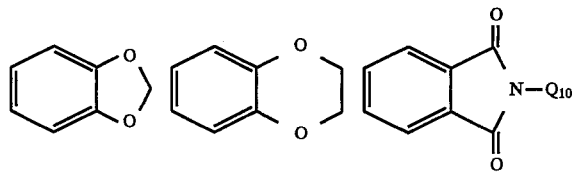

wherein $Q_{10}$ represents a hydrogen atom or a linear or branched alkyl, substituted or unsubstituted cycloalkyl, or substituted or unsubstituted aryl group. Preferred examples of the linear or branched alkyl group are those having 1-20 carbon atoms. The substituted or unsubstituted cycloalkyl group can represent a cycloalkyl group which may be substituted by one or more halogen atom or hydroxyl, linear or branched alkyl, halogenated alkyl or alkoxy groups, and preferably represents a substituted or unsubstituted cyclohexyl group. The substituted or unsubstituted aryl group can represent a phenyl, biphenyl, terphenyl, naphthyl or pyridyl group, which may be substituted by one or more halogen atoms or hydroxy, linear or branched alkyl, substituted or unsubstituted cycloalkyl, alkoxy, aryl, aryloxy, alkylaminocarbonyl, arylaminocarbonyl or arylazo groups.

The aromatic ring, aliphatic ring or heterocyclic ring which is represented by $Y_1$ or $Y_2$ may be substituted by halogen atoms and hydroxyl, alkyl, halogenated alkyl, alkoxy, carboxyl, alkoxycarbonyl, aryloxycarbonyl, alkylaminocarbonyl, arylaminocarbonyl, phenyl, biphenyl and cyclohexyl groups.

Here, preferred examples of $Y_1$ or $Y_2$ are benzene, naphthalene, anthraquinone and pyridine rings which may be substituted by one or more halogen atoms or hydroxyl, alkyl, halogenated alkyl, alkoxy, carboxyl, alkoxycarbonyl, aryloxycarbonyl, alkylaminocarbonyl, phenyl, biphenyl or cyclohexyl groups. More preferred examples of $Y_1$ or $Y_2$ are benzene rings which may be substituted by one or more halogen atoms or hydroxyl, alkyl, halogenated alkyl, carboxyl, phenyl or cyclohexyl groups.

In the substituent represented by $Z_1$ in the substituent A, preferred examples of the linear or branched alkyl group are those containing 1-20 carbon atoms. Illustrative examples of the substituted or unsubstituted cycloalkyl group are cycloalkyl groups which may be substituted by one or more halogen atoms or hydroxy, linear or branched alkyl, halogenated alkyl or alkoxy groups, and a substituted or unsubstituted cyclohexyl group are preferred. The substituted or unsubstituted aryl group may represent a phenyl, biphenyl, terphenyl, naphthyl or pyridyl group which may be substituted by one or more halogen atoms or hydroxyl, linear or branched alkyl, substituted or unsubstituted cycloalkyl, alkoxy, aryl, aryloxy, alkylaminocarbonyl, arylaminocarbonyl or arylazo groups. A preferred example of the substituent $Z_1$ is a substituted or unsubstituted aryl group, and a more preferred example is a phenyl group which may be substituted by one or more halogen atoms or hydroxy, linear or branched alkyl, or substituted or unsubstituted cycloalkyl groups.

In the substituents represented by $R_{21}$–$R_{26}$ in the substituent A, illustrative examples of the linear or branched $C_{1-10}$ alkyl group include methyl, ethyl, n-propyl, isopropyl, n-butyl, tert-butyl, isopentyl, n-hexyl, 2-methylpentyl, 1,2-dimethylbutyl, 1,1-diethylethyl, n-heptyl, n-octyl, n-nonyl and n-decyl. Further, illustrative examples of the $C_{5-6}$ cycloalkyl groups include cyclopentyl and cyclohexyl.

When the quinophthalone compound according to the present invention is used in the production of a polarizing film, it is preferred to use it in a form purified by recrystallization or another purification method although it can be used in its crude form. In addition, it is also preferred to grind the compound into 0.1–100 µm diameter prior to use.

The amount of the dyestuff to be used is determined by the coloring ability of the dyestuff for the base material resin, which is a hydrophobic resin, and also the thickness of a target polarizing film. It is however preferred to adjust its amount so that the visible light transmittance per sheet of the resulting polarizing film ranges from 30% to 60%. If the thickness of a polarizing film is 30–200 µm, for example, the amount of the dyestuff is in a range of 0.01–10 wt. % based on the resin.

Each polarizing film according to the present invention contains at least one of the above compounds. To obtain a preferred hue, especially a polarizing film of a neutral gray color, one or more other dyestuffs can be added in combination. In addition to one or more dichroic dyestuffs disclosed in the present invention, the polarizing film may contain one or more other dichroic dyestuffs and/or one or more dyestuffs free of dichroism. Additives such as ultraviolet absorbers and near infrared absorbers can be also contained in the polarizing film.

No particular limitation is imposed on the hydrophobic resin employed in the polarizing film according to the present invention insofar as it is an organic polymer of a linear structure having no hydrophilic group from the standpoint of molecular structure. It is however desired for the hydrophobic resin to have thermoplasticity. Specific examples include halogenated vinyl resins, acrylic resins, polyolefin resins, polyamide resins, polyimide resins, polyester resins, polycarbonate resins and polyether sulfone resins. Among these, resin compositions containing at least 80 wt. % of an aromatic polyester resin component such as polyethylene terephthalate, polyethylene naphthalate, polybutylene terephthalate or polyethylene bis-$\alpha,\beta$-(2-chlorophenoxy)ethane-4,4'-dicarboxylate are preferred. Especially preferred is polyethylene terephthalate which is excellent in heat resistance, moisture resistance and transparency.

To incorporate the dyestuff in the base material resin which is a hydrophobic resin, conventionally known methods can be used. They include the following methods: a) the dyestuff is dry blended in the resin and the blend is then kneaded in an extruder; or the mass so kneaded is used as a master batch; and b) a shapeless sheet of the resin is dipped in a solvent in which the dyestuff has been dissolved, whereby the resin sheet is impregnated with the dyestuff. Of these, the method a) which features kneading in an extruder subsequent to dry blending is most preferred for the ease in controlling the concentration of the dyestuff.

To produce a polarizing film according to the present invention, a base material resin is colored with at least one dyestuff selected from the dyestuffs according to the present invention and, if it is necessary to mix one or more other dyestuffs, the such other dyestuffs by the above-described method. The resin is then formed into a film or sheet, followed by stretching 3.5–7.0 times, preferably 4.0–6.5 times in one of longitudinal and lateral directions at (Tg–20° C.) to (Tg+50° C.) (Tg means the glass transition temperature of the base material resin). Either subsequent to or concurrently with this stretching, it is possible to stretch the film 2.0 times or less in a direction perpendicular to the direction of the above stretching. The stretched film is then heat-treated preferably at 80° C.–150° C., whereby a polarizing film is provided.

The polarizing film so produced is then processed into a film or sheet of various forms depending on its application purpose, and can then be provided for actual use.

Films produced by the above-described process can be furnished as polarizing sheets or films as they are or in a form provided on one side or both sides thereof with a protective film excellent in optical transparency and mechanical strength, for example, a protective film (layer) made of a colored or uncolored glass or synthetic resin. For the sake of convenience upon using them on liquid crystal displays, window panes, eye glasses and the like, they can be furnished in a form applied on one side or both sides with an adhesive. They can also be furnished in a form provided on one side thereof with a transparent conductive film of indium-tin oxide or the like applied by a known method such as vacuum deposition, sputtering or a coating method. They can be used as cell-forming materials for liquid crystal display devices.

Certain representative examples of the compounds of the present invention and polarizing films making use of the compounds will hereinafter be described specifically by examples. It is to be borne in mind however that the present invention is not limited at all by these examples.

In the examples, the polarizing performance of each compound will be indicated in terms of a dichroism ratio (dichroic ratio). This dichroism ratio is a value measured by the method to be described next. Namely, two polarizing films are superposed one over the other in such a way that their stretched directions extend in parallel with each other. The absorbance measured at a maximum absorption wavelength in the visible range in an optical path of a spectrophotometer is represented by A∥, whereas the average value of absorbances at 850–900 nm is represented by B∥. The two polarizing films are then superposed one over the other so that their stretched directions cross at a right angle. The absorbance measured at a maximum absorption wavelength in the visible range is represented by A⊥, whereas the average value of absorbances at 850–900 nm is represented by B⊥. As a value representing the polarizing performance of the dyestuff from which the absorption by the film base material has been deducted, the dichroic ratio (DR) was calculated using the fol- lowing equation:

$DR=(A\perp-B\perp)/(A\|-B\|)$

In the examples, all designations of "part" or "parts" mean part or parts by weight.

EXAMPLE 1

16 parts of 2,3,6,7-naphthalenetetracarboxylic dianhydride and 12 parts of 3-hydroxy-2-methylquinoline-4-carboxylic acid were stirred in 180 parts of sulfolane at 210° C. for 5 hours. After the reaction mixture was cooled to room temperature, a precipitate was collected by filtration, washed with methanol and then dried, whereby the compound of the following formula (A) was obtained in an amount of 20 parts.

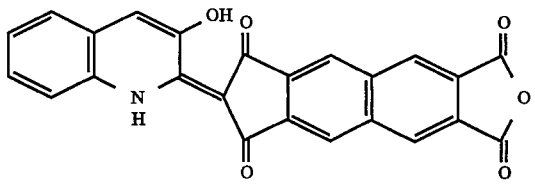

(A)

Its absorption maximum wavelength was 463 nm in DMF and its elemental analysis data were as follows:

| ($C_{24}H_{11}NO_6$) | C(%) | H(%) | N(%) |
| --- | --- | --- | --- |
| Calculated: | 70.42 | 2.71 | 3.42 |
| Found: | 70.21 | 2.80 | 3.34 |

Next, in 140 parts of 1,3-dimethyl-2-imidazolidinone (DMI), 8.2 parts of the compound represented by the formula (A) and 8.0 parts of 4-amino-4-(4-n-octylphenylaminocarbonyl)biphenyl were stirred at 150° C. for 5 hours. After the reaction mixture was cooled to room temperature, a precipitate was collected by filtration, washed with DMI and then with methanol, and then dried, whereby the compound of the following formula (B) was obtained in an amount of 11.7 parts.

The absorption maximum wavelength of the compound (B) in o-chlorophenol was 465 nm. Its melting point was 300° C. or higher and its elemental analysis data were as follows:

| ($C_{51}H_{41}N_3O_6$) | C(%) | H(%) | N(%) |
| --- | --- | --- | --- |
| Calculated: | 77.36 | 5.21 | 5.31 |
| Found: | 77.55 | 5.28 | 5.29 |

This compound was added to pellets of polyethylene terephthalate resin so that the monolayer transmittance of a resulting polarizing film would become 40%. After being uniformly mixed, the resulting mixture was melt-extruded into a sheet of about 200 μm in thickness. Using a tenter, this sheet was stretched 5 times in the lateral direction at 80° C. It was then subjected to heat treatment at 150° C. for 1 minute, whereby a yellow orange polarizing film of 100 μm in thickness was obtained. Its dichroic ratio at the maximum absorption wavelength of 477 nm was 39.5, i.e. excellent.

This polarizing film was subjected for 500 hours under the conditions of 80° C. and 90% RH. Neither change in hue nor reduction in dichroic ratio was observed practically. The shrinkage of the film was not greater than 1% in both the longitudinal and lateral directions, so that the film had good dimensional stability. Further, the polarizing film was left subjected for 500 hours in a drier which was controlled at 120° C. The film showed no reduction in the degree of polarization and retained good dimensional stability.

EXAMPLE 2

The compound of the following formula (D):

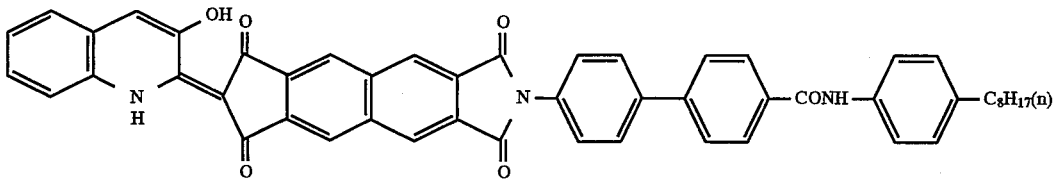

(B)

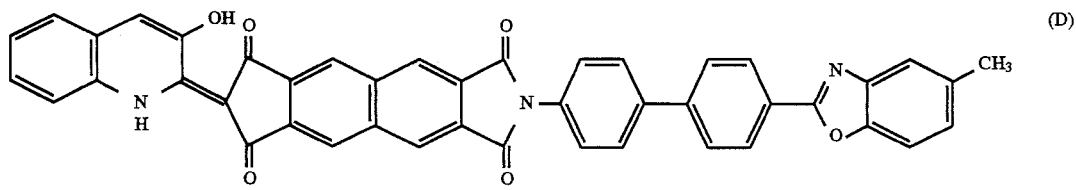

(D)

was obtained in a similar manner to Example 1 except for the use of the compound represented by the following formula (C) instead of 4-amino-4'-(4-n-octylphenylaminocarbonyl)biphenyl:

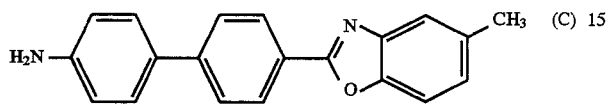

The absorption maximum wavelength of the compound (D) in o-chlorophenol was 465 nm. Its melting point was 300° C. or higher and its elemental analysis data were as follows:

| ($C_{44}H_{25}N_3O_6$) | C(%) | H(%) | N(%) |
|---|---|---|---|
| Calculated: | 76.41 | 3.64 | 6.08 |
| Found: | 76.58 | 3.79 | 5.99 |

Using the compound (D), a film was formed and processed in a similar manner to Example 1. A polarizing film of a yellow orange color was obtained. The dichroic ratio at its maximum absorption of 478 nm was 39.4, i.e., excellent. As a result of durability tests similar to those conducted in Example 1, the film showed no reduction in the degree of polarization and retained good dimensional stability.

EXAMPLE 3

The compound of the following formula (F):

The absorption maximum wavelength of the compound (F) in o-chlorophenol was 465 nm. Its melting point was above 300° C. and its elemental analysis data were as follows:

| ($C_{45}H_{26}N_4O_6$) | C(%) | H(%) | N(%) |
|---|---|---|---|
| Calculated: | 75.21 | 3.64 | 7.80 |
| Found: | 74.99 | 3.56 | 7.74 |

Using the compound (F), a film was formed and processed in a similar manner to Example 1. A polarizing film of a yellow orange color was obtained. The dichroic ratio at its maximum absorption of 478 nm was 38.7, i.e., excellent. As a result of durability tests similar to those conducted in Example 1, the film showed no reduction in the degree of polarization and retained good dimensional stability.

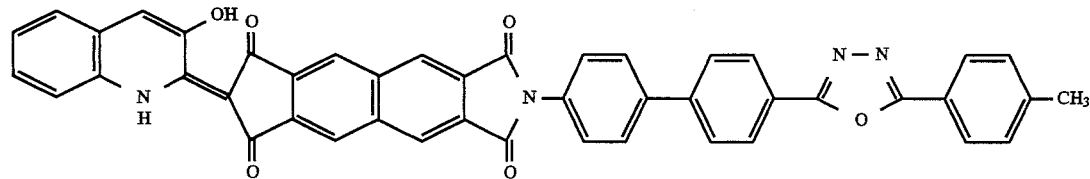

(F)

was obtained in a similar manner to Example 1 except for the use of the compound represented by the following formula (E) instead of 4-amino-4'-(4-n-octylphenylaminocarbonyl)biphenyl:

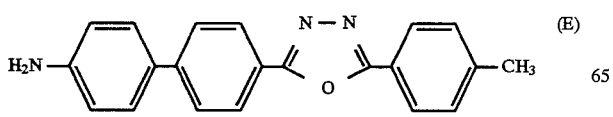

(E)

EXAMPLE 4

The compound of the following formula (H):

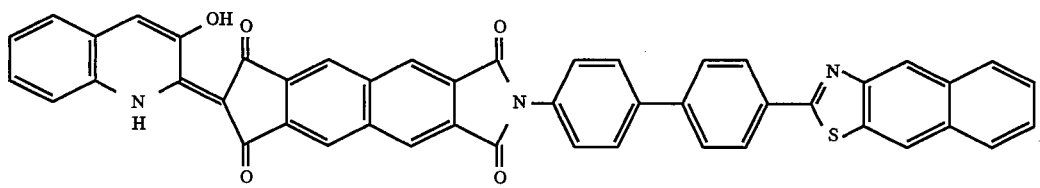

was obtained in a similar manner to Example 1 except for the use of the compound represented by the following formula (G) instead of 4-amino-4'-(4-n-octylphenylaminocarbonyl)biphenyl:

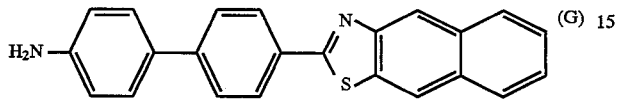

The absorption maximum wavelength of the compound (H) in o-chlorophenol was 465 nm. Its melting point was above 300° C. and its elemental analysis data were as follows:

| ($C_{47}H_{25}N_3O_5S$) | C(%) | H(%) | N(%) |
| --- | --- | --- | --- |
| Calculated: | 75.90 | 3.39 | 5.65 |
| Found: | 75.82 | 3.48 | 5.69 |

Using the compound (H), a film was formed and processed in a similar manner to Example 1. A polarizing film of a yellow orange color was obtained. The dichroic ratio at its maximum absorption of 478 nm was 40.1, i.e., excellent. As a result of durability tests similar to those conducted in Example 1, the film showed no reduction in the degree of polarization and retained good dimensional stability.

EXAMPLES 5–136

Polarizing films were produced in a similar manner to Example 1 except for the replacement of the compound by the various quinophthalone compounds shown in Tables 1-1 to 1-2, Tables 2-1 to 2-3, Tables 3-1, to 3-2, Tables 4-1 to 4-2, Table 5, Table 6, Table 7, Table 8, Table 9, Table 10 and Table 11, respectively.

In the respective tables, the structural formulas of the dyestuffs and the dichroic ratios and hues of the polarizing films are shown.

Under "dichroic ratio" in each table, "A" indicates a value of 30 or greater while "B" designates a value of 25 or higher.

All the polarizing films so obtained had excellent polarizing performance.

TABLE 1-1
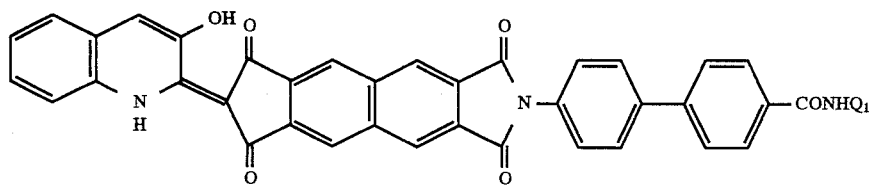
| Example | Structural formula of $Q_1$ | Dichroic ratio | Hue |
|---|---|---|---|
| 5 | $-C_8H_{17}(n)$ | B | Yellow orange |
| 6 | -⟨H⟩-Cl | A | Yellow orange |
| 7 | -⟨H⟩-CH$_3$ | A | Yellow orange |
| 8 | -⟨H⟩-OCH$_3$ | A | Yellow orange |
| 9 | -⟨⟩-I (meta) | A | Yellow orange |
| 10 | -⟨⟩-OH (meta) | A | Yellow orange |
| 11 | -⟨⟩-CH$_2$OC$_3$H$_8$(n) | A | Yellow orange |
| 12 | -⟨⟩-CF$_3$ | A | Yellow orange |
| 13 | -⟨⟩-⟨H⟩-CH$_3$ | A | Yellow orange |
| 14 | -⟨⟩-OC$_5$H$_{11}$(n) | A | Yellow orange |

TABLE 1-2
| Example | Structural formula of $Q_1$ | Dichroic ratio | Hue |
|---|---|---|---|
| 15 | 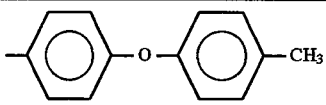 | A | Yellow orange |
| 16 | 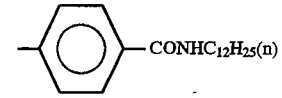 | A | Yellow orange |
| 17 | 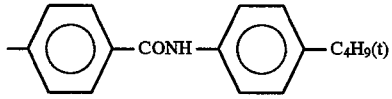 | A | Yellow orange |
| 18 | 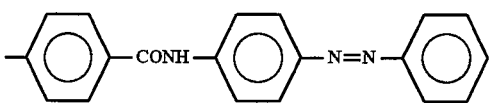 | A | Yellow orange |
| 19 | 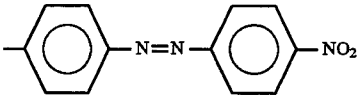 | A | Yellow orange |
| 20 | 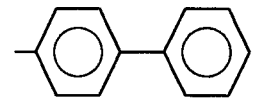 | A | Yellow orange |
| 21 | 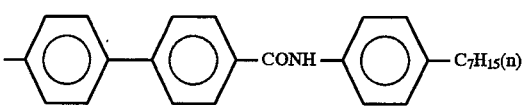 | A | Yellow orange |
| 22 | 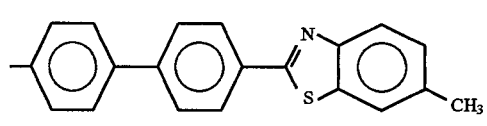 | A | Yellow orange |
| 23 | 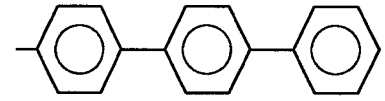 | A | Yellow orange |
| 24 | 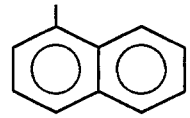 | A | Yellow orange |
| 25 | 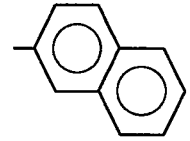 | A | Yellow orange |
| 26 | 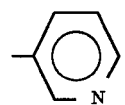 | A | Yellow orange |

TABLE 2-1
| Example | Structural formula of A | Dichroic ratio | Hue |
| --- | --- | --- | --- |
| 27 | 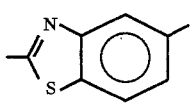 | A | Yellow orange |
| 28 | 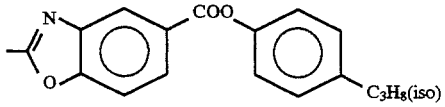 | A | Yellow orange |
| 29 | 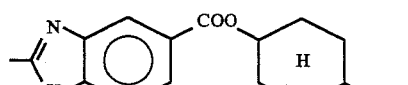 | A | Yellow orange |
| 30 | 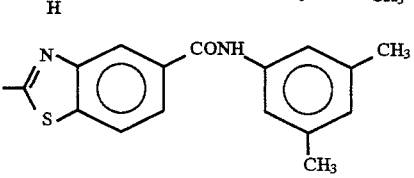 | A | Yellow orange |
| 31 | 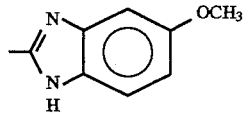 | A | Yellow orange |
| 32 | 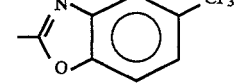 | A | Yellow orange |
| 33 | 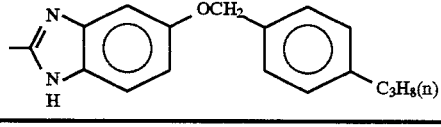 | A | Yellow orange |
| 34 | | A | Yellow orange |
TABLE 2-2
| Example | Structural formula of A | Dichroic ratio | Hue |
| --- | --- | --- | --- |
| 35 | 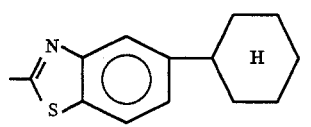 | A | Yellow orange |
TABLE 2-2-continued
| Example | Structural formula of A | Dichroic ratio | Hue |
| --- | --- | --- | --- |
| 36 | 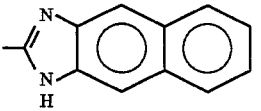 | A | Yellow orange |

TABLE 2-2-continued
| Example | Structural formula of A | Dichroic ratio | Hue |
|---|---|---|---|
| 37 | 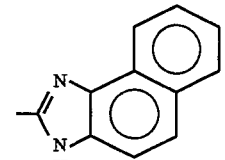 | A | Yellow orange |
| 38 | | A | Yellow orange |
| 39 | | A | Yellow orange |
| 40 | | A | Yellow orange |
| 41 | 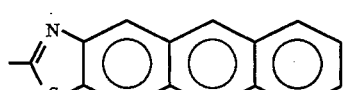 | A | Yellow orange |
| 42 | | A | Yellow orange |
| 43 | | A | Yellow orange |
| 44 | | A | Yellow orange |
TABLE 2-3
| Example | Structural formula of A | Dichroic ratio | Hue |
|---|---|---|---|
| 45 | 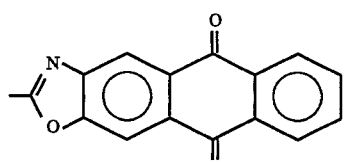 | A | Yellow orange |
| 46 | | A | Yellow orange |
| 47 | | A | Yellow orange |
| 48 | | A | Yellow orange |
| 49 | | A | Yellow orange |
| 50 | 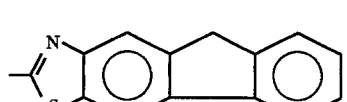 | A | Yellow orange |

TABLE 2-3-continued
| Example | Structural formula of A | Dichroic ratio | Hue |
|---|---|---|---|
| 51 | | A | Yellow orange |
| 52 | | A | Yellow orange |
| 53 | | A | Yellow orange |
| 54 | | A | Yellow orange |
TABLE 3-1
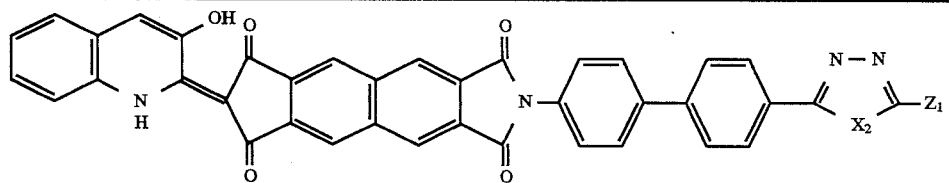
| Example | $X_2$ | Structural formula of $Z_1$ | Dichroic ratio | Hue |
|---|---|---|---|---|
| 55 | S | $-C_8H_{17}$ (n) | B | Yellow orange |
| 56 | NH | —⟨H⟩—OCH₃ | B | Yellow orange |
| 57 | O | —⟨⟩—I | A | Yellow orange |
| 58 | O | —⟨⟩—OH | A | Yellow orange |
| 59 | NH | —⟨⟩—CH₂OC₃H₈(n) | A | Yellow orange |

TABLE 3-1-continued

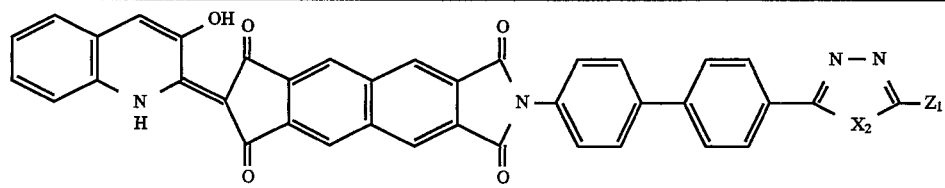

| Example | $X_2$ | Structural formula of $Z_1$ | Dichroic ratio | Hue |
|---|---|---|---|---|
| 60 | S | —C₆H₄—CF₃ | A | Yellow orange |
| 61 | S | —C₆H₄—CH(H)—CH₃ (cyclohexyl with CH₃) | A | Yellow orange |
| 62 | NH | —C₆H₄—OC₆H₁₁(n) | A | Yellow orange |
| 63 | S | —C₆H₄—O—C₆H₄—CH₃ | A | Yellow orange |
| 64 | O | —C₆H₄—CONHC₁₂H₂₅(n) | A | Yellow orange |

TABLE 3-2

| Example | $X_2$ | Structural formula of $Z_1$ | Dichroic ratio | Hue |
|---|---|---|---|---|
| 65 | S | —C₆H₄—CONH—C₆H₄—C₄H₉(t) | A | Yellow orange |
| 66 | NH | —C₆H₄—CONH—C₆H₄—N=N—C₆H₅ | A | Yellow orange |
| 67 | S | —C₆H₄—N=N—C₆H₄—NO₂ | A | Yellow orange |
| 68 | O | —C₆H₄—C₆H₅ | A | Yellow orange |
| 69 | NH | —C₆H₄—C₆H₄—CONH—C₆H₄—C₇H₁₅(n) | A | Yellow orange |

TABLE 3-2-continued

| Example | $X_2$ | Structural formula of $Z_1$ | Dichroic ratio | Hue |
|---|---|---|---|---|
| 70 | O | (biphenyl)-benzothiazole-CH₃ | A | Yellow orange |
| 71 | S | (biphenyl)-benzothiazole-C₄H₉(t) | A | Yellow orange |
| 72 | O | terphenyl | A | Yellow orange |
| 73 | NH | (terphenyl)-CONH-(phenyl) | A | Yellow orange |
| 74 | S | naphthyl (1-) | A | Yellow orange |
| 75 | NH | naphthyl (2-) | A | Yellow orange |
| 76 | O | pyridyl | A | Yellow orange |

TABLE 4-1

Structure: quinoline-CH=C(OH)-indanedione fused naphthalene-diimide-N-(biphenyl)-A

| Example | Structural formula of A | Dichroic ratio | Hue |
|---|---|---|---|
| 77 | —$C_{15}H_{32}$ (n) | B | Yellow orange |
| 78 | —(cyclohexyl, H)—$C_2H_5$ | B | Yellow orange |
| 79 | —$C_2H_4OC_5H_{11}$ (n) | B | Yellow orange |
| 80 | —$OC_{13}H_{27}$ (n) | B | Yellow orange |

TABLE 4-1-continued

| Example | Structural formula of A | Dichroic ratio | Hue |
|---|---|---|---|
| 81 | —O—⟨C₆H₄⟩—⟨C₆H₅⟩ | A | Yellow orange |
| 82 | —NH—⟨C₆H₁₁⟩ | B | Yellow orange |
| 83 | —NH—⟨C₆H₅⟩ | B | Yellow orange |
| 84 | —COOC$_3$H$_7$ | B | Yellow orange |
| 85 | —COO—⟨naphthyl⟩ | A | Yellow orange |
| 86 | —NHCO—⟨C₆H₁₀⟩—CH$_3$ | A | Yellow orange |
| 87 | —NHCO—⟨C₆H₄⟩—C$_6$H$_{13}$(n) | A | Yellow orange |
| 88 | —OCOCH$_3$ | B | Yellow orange |

TABLE 4-2

| Example | Structural formula of A | Dichroic ratio | Hue |
|---|---|---|---|
| 89 | —OCO—⟨C₆H₄⟩—⟨C₆H₄⟩—NO$_2$ | B | Yellow orange |
| 90 | —CH=CH—⟨C₆H₅⟩ | B | Yellow orange |
| 91 | —C≡C—⟨C₆H₅⟩ | B | Yellow orange |

TABLE 4-2-continued

| Example | Structural formula of A | Dichroic ratio | Hue |
|---|---|---|---|
| 92 | -N=N-⟨C₆H₄⟩-N(CH₃)₂ | B | Yellow orange |
| 93 | phthalimide-N-⟨C₆H₄⟩-OCH₃ (pyromellitic diimide) | A | Yellow orange |
| 94 | phthalimide with COOH substituent | A | Yellow orange |

TABLE 5

[Structure: substituted naphthalene diimide dye with R₁, R₂, R₃ on phenyl ring and A substituent on biphenyl]

| Example | R₁, R₂, R₃ | Structural formula of A | Dichroic ratio | Hue |
|---|---|---|---|---|
| 95 | Br, H, H | thiazole-⟨C₆H₄⟩-Cl | A | Orange |
| 96 | H, Br, Br | -CONH-⟨C₆H₄⟩-C₆H₁₇(n) | B | Orange |
| 97 | H, H, OC₄H₉ (n) | benzothiazole-2,5,6-(CH₃)₂ | A | Orange |
| 98 | H, H, C₄H₉ (t) | N-N, NH, ⟨C₆H₄⟩-CH₃ | A | Yellow orange |
| 99 | H, H, cyclohexyl(H) | -CONH-⟨C₆H₄⟩-C₈H₁₇(n) | A | Orange |

TABLE 6

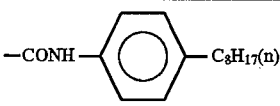

| Example | $R_7$, $R_{10}$ | Structural formula of A | Dichroic ratio | Hue |
|---|---|---|---|---|
| 100 | $CH_3$, $CH_3$ | —CONH—⟨C₆H₄⟩—$C_8H_{17}(n)$ | B | Yellow orange |
| 101 | Cl, Cl | 2-methyl-5,6-dimethylbenzothiazolyl | B | Yellow orange |
| 102 | $OCH_3$, $OCH_3$ | oxadiazolyl-(4-Cl-phenyl) | B | Yellow orange |
| 103 | $OCH_3$, $OCH_3$ | —NHCO—⟨C₆H₄⟩—$C_8H_{17}(n)$ | B | Yellow orange |

TABLE 7

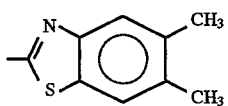

| Example | Structural formula of $Q_1$ | Dichroic ratio | Hue |
|---|---|---|---|
| 104 | 4-$CH_2Cl$-phenyl | A | Yellow orange |
| 105 | 2-$H_3CO$-4-$CH_3$-phenyl | A | Yellow orange |
| 106 | 2,4-di$CH_3$-phenyl | A | Yellow orange |
| 107 | 3-$OC_2H_5$-phenyl | A | Yellow orange |

TABLE 7-continued

[Structure: compound with biphenyl group ending in —CONHQ₁]

| Example | Structural formula of Q₁ | Dichroic ratio | Hue |
|---------|--------------------------|----------------|-----|
| 108 | 2,4,6-trimethylphenyl (H₃C, CH₃, H₃C substituted benzene) | A | Yellow orange |
| 109 | 4-isohexylphenyl (—C₆H₁₃(iso)) | A | Yellow orange |
| 110 | 3-n-pentylphenyl (C₅H₁₁(n)) | A | Yellow orange |
| 111 | 3,5-dimethylphenyl (CH₃, H₃C substituted benzene) | A | Yellow orange |

TABLE 8

[Structure: compound with biphenyl group ending in —A]

| Example | Structural formula of A | Dichroic ratio | Hue |
|---------|-------------------------|----------------|-----|
| 112 | 2-methyl-5,6-diethylbenzothiazole (with C₂H₅, C₂H₅) | A | Yellow orange |
| 113 | 2-methyl-5-chloromethylbenzoxazole (with CH₂Cl) | A | Yellow orange |

TABLE 8-continued

| Example | Structural formula of A | Dichroic ratio | Hue |
|---|---|---|---|
| 114 | 2-methylbenzimidazole with C₈H₁₇(n) | A | Yellow orange |
| 115 | 2-methylbenzoxazole with C₃H₇(iso) | A | Yellow orange |
| 116 | naphthalimide | A | Yellow orange |
| 117 | naphthalimide (isomer) | A | Yellow orange |
| 118 | 2-methyl-phenylbenzoxazole | A | Yellow orange |
| 119 | 2,4,6-trimethylbenzimidazole | A | Yellow orange |

TABLE 9

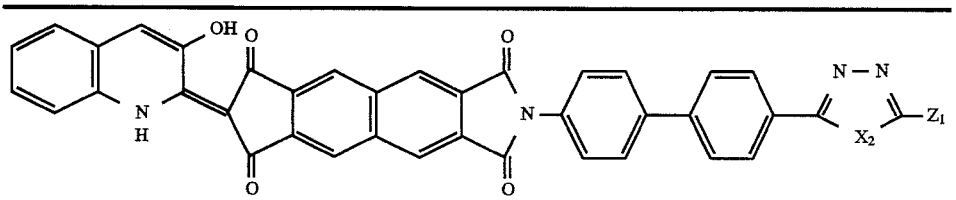

| Example | $X_2$ | Structural formula of $Z_1$ | Dichroic ratio | Hue |
|---|---|---|---|---|
| 120 | S | 2-methyl-5-substituted-aniline (NH₂, CH₃) | A | Yellow orange |
| 121 | NH | 2-methyl-phenyl ether (H₅C₂O) | A | Yellow orange |
| 122 | S | 3-(CH₂Cl)-phenyl | A | Yellow orange |
| 123 | O | 2-methyl-3-fluoro-phenyl (H₃C, F) | A | Yellow orange |
| 124 | NH | 4-$C_5H_{11}(n)$-phenyl | A | Yellow orange |
| 125 | NH | 3,5-di-$C_4H_9(t)$-phenyl | A | Yellow orange |
| 126 | O | 4-$C_8H_{17}(n)$-phenyl | A | Yellow orange |
| 127 | S | 4-$C_8H_{17}(n)$-phenyl | A | Yellow orange |
| 128 | S | 2,4,6-tri-CH₃-phenyl | A | Yellow orange |

TABLE 10

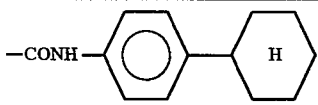

| Example | Structural formula of A | Dichroic ratio | Hue |
|---|---|---|---|
| 129 | 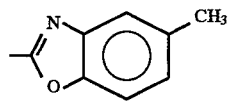 —CONH—〇—〇 H | A | Yellow orange |
| 130 | 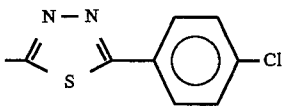 | A | Yellow orange |
| 131 | 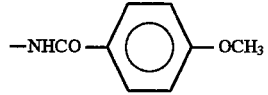 —Cl | A | Yellow orange |
| 132 | —NHCO—〇—OCH₃ | A | Yellow orange |

TABLE 11

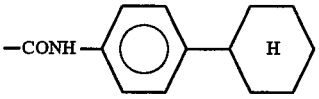

| Example | Structural formula of A | Dichroic ratio | Hue |
|---|---|---|---|
| 133 | —CONH—〇—〇 H | B | Yellow orange |
| 134 | 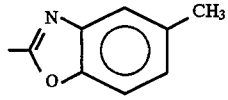 | B | Yellow orange |
| 135 | 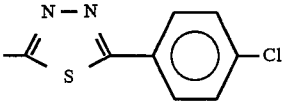 —Cl | B | Yellow orange |
| 136 | —NHCO—〇—OCH₃ | B | Yellow orange |

COMPARATIVE EXAMPLES 1–6

Polarizing films were produced in a similar manner to Example 1 except for the use of the dyestuffs shown in Table 12 (the dyestuffs of Examples 3, 27 and 31 in Japanese Patent Laid-Open No. 270664/1987 and the dyestuffs of Examples 1 and 3 and No. 2 in Table 1 of Example 4 in Japanese Patent Laid-Open No. 49705/1988). All the polarizing films so obtained were inferior to the polarizing films obtained using quinophthalone compounds according to the present invention.

The structural formulas of the dyestuffs and the dichroic ratio and absorption maximum wavelength ($\lambda_{max}$) are shown in Table 12.

TABLE 12

| Comparative Example | Structural formula | Dichroic ratio | $\lambda_{max}$ (nm) |
|---|---|---|---|
| 1 | 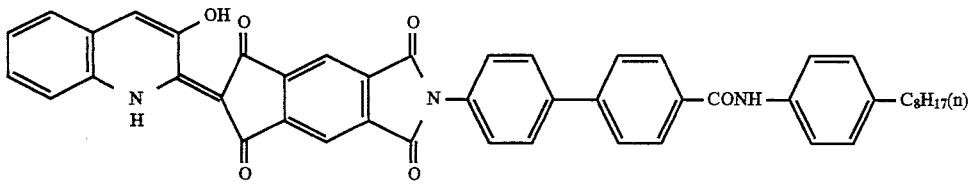 | 18.5 | 455 |
| 2 | 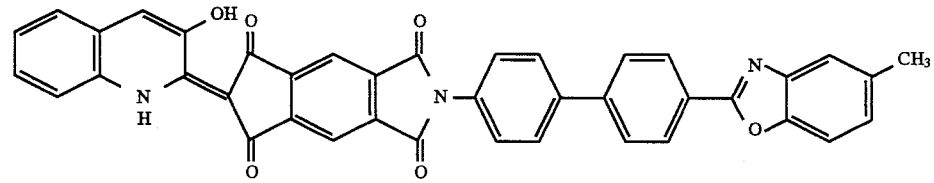 | 19.6 | 455 |
| 3 | 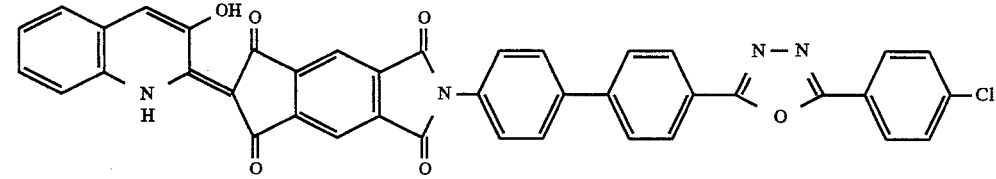 | 18.1 | 455 |
| 4 | 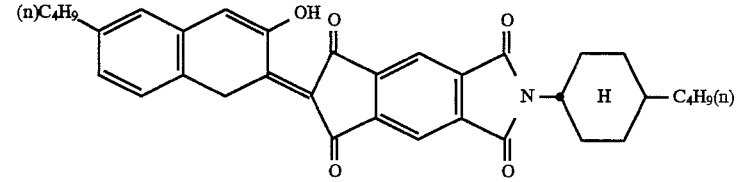 | 10.5 | 455 |
| 5 | 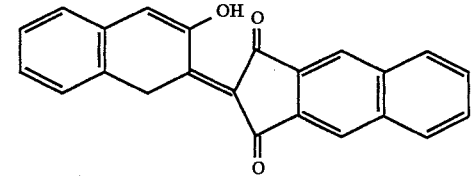 | 12.1 | 465 |
| 6 | 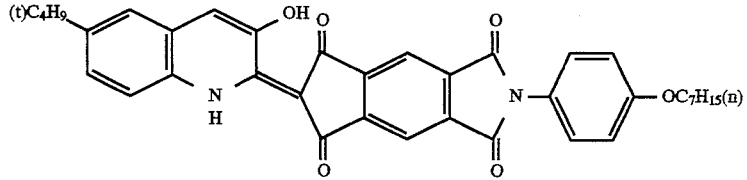 | 15.2 | 455 |

What is claimed is:

1. A quinophthalone compound represented by the following formula (1):

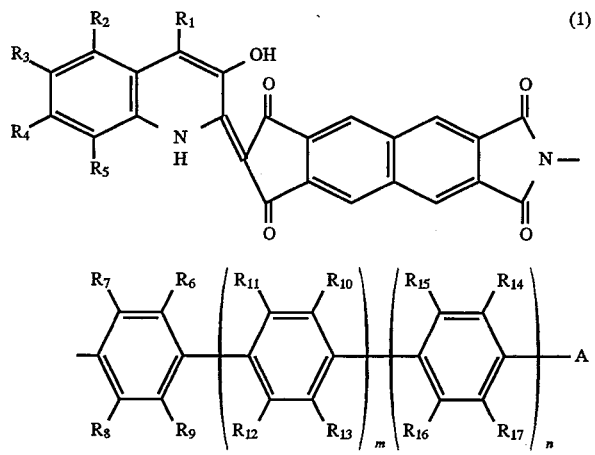

wherein $R_1$–$R_5$ each independently represents a hydrogen or halogen atom or a hydroxy, linear or branched alkyl, unsubstituted cycloalkyl, cycloalkyl substituted by one or more halogen atoms and/or alkyl groups, halogenated alkyl, alkoxyalkyl, alkoxy, nitro, amino, alkylamino, carboxyl, alkoxycarbonyl, aminocarbonyl, alkylaminocarbonyl, alkylcarbonylamino, alkylcarbonyloxy or cyano group; $R_6$–$R_{17}$ each independently represents a hydrogen or halogen atom or a hydroxyl, alkyl, halogenated alkyl, alkoxy, nitro, amino, alkylamino, carboxyl, alkoxycarbonyl, aminocarbonyl, alkylaminocarbonyl, alkylcarbonyloxy or cyano group; m and n each stands for 0 or 1; and A represents a hydrogen or halogen atom or a hydroxy, linear or branched alkyl, cycloalkyl, halogenated alkyl, alkoxyalkyl, nitro, amino, alkylamino, cyano, —$OQ_2$, —$NHQ_3$, —$COOQ_4$, —$NHCOQ_5$, —$OCOQ_6$, —CH=CH—$Q_7$, —C≡C—$Q_8$, or —N=N—$Q_9$ group or a group represented by one of the following formulas (2a)–(2d):

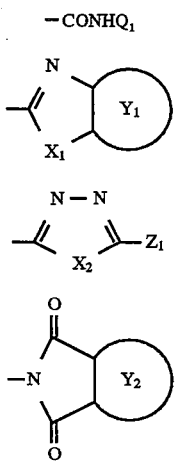

wherein $Q_1$ to $Q_9$ represent a hydrogen atom or a linear or branched alkyl, unsubstituted cycloalkyl, cycloalkyl group substituted by one or more halogen atoms, hydroxy groups, linear or branched alkyl groups, halogenated alkyl groups, or alkoxy groups, unsubstituted aryl, or aryl group substituted by one or more halogen atoms, hydroxy groups, linear or branched alkyl groups, halogenated alkyl groups, alkoxyalkyl groups, cycloalkyl groups, said substituted cycloaklyl groups, alkoxy groups, aryloxy groups, alkylaminocarbonyl groups, arylaminocarbonyl groups or arylazo groups; $X_1$ and $X_2$ represent an —O—, —S— or —NH— group; $Y_1$ and $Y_2$ represent an unsubstituted aromatic, alicyclic or heterocyclic ring, or an aromatic, alicyclic or heterocyclic ring substituted by halogen atoms and hydroxy, alkyl, halogenated alkyl, alkoxy, carboxy, alkoxycarbonyl, aryloxycarbonyl, alkylaminocarbonyl, arylaminocarbonyl, phenyl, biphenyl and cyclohexyl groups, where said heterocyclic ring is selected from the group consisting of pyridyl, pyrazinyl, pyrimidinyl, indolyl, isoindolyl, quinolyl, isoquinolyl, purinyl, acridinyl, pyrrolyl, thienyl, furyl, benzopyrrolyl, benzothienyl, benzofuranyl, benzoxazolyl, benzothiazolyl, benzimidazolyl, benzotriazolyl, piperidyl, piperazinyl, and groups represented by the following formulas:

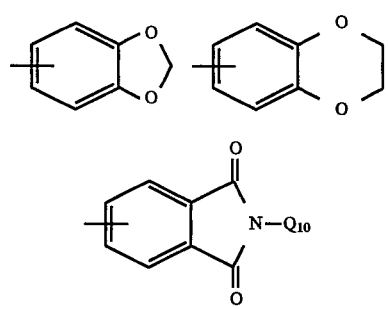

wherein $Q_{10}$ represents a hydrogen atom or a linear or branched alkyl, unsubstituted cycloalkyl, cycloalkyl substituted by one or more halogen atoms or hydroxy, linear or branched alkyl, halogenated alkyl or alkoxy groups, unsubstituted aryl group or aryl group substituted by one or more halogen atoms or hydroxy, linear or branched alkyl, unsubstituted cycloalkyl, said substituted cycloalkyl groups, alkoxy groups, aryl groups, aryloxy groups, alkylaminocarbonyl groups, arylaminocarbonyl groups or arylazo groups; and $Z_1$ represents a hydrogen atom or a linear or branched alkyl, unsubstituted cycloalkyl, cycloalkyl group substituted by one or more halogen atoms, hydroxy groups, linear or branched alkyl groups, halogenated alkyl groups, or alkoxy groups, unsubstituted aryl, or aryl group substituted by one or more halogen atoms, hydroxy groups, linear or branched alkyl groups, halogenated alkyl groups, alkoxyalkyl groups, cycloalkyl groups, said substituted cycloaklyl groups, alkoxy groups, aryloxy groups, alkylaminocarbonyl groups, arylaminocarbonyl groups or arylazo groups.

2. A quinophthalone compound according to claim 1, wherein $R_1$, $R_2$ and $R_4$–$R_{17}$ are individually a hydrogen atom, $R_3$ is a hydrogen atom or a linear or branched $C_{1-5}$ alkyl group, and m+n=1 or 2.

3. A quinophthalone compound according to claim 1, wherein the substituent A is a group represented by the formulas (2a), (2b), (2c) or (2d).

4. A quinophthalone compound according to claim 3, wherein the substituent A is a group represented by the following formula (2e), (2f) or (2g):

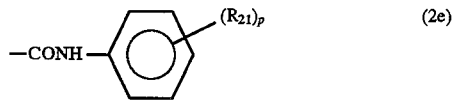

-continued
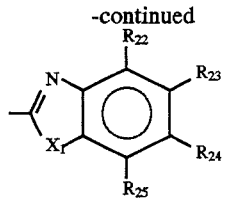
(2f)
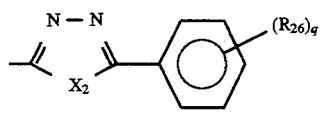
(2g)
wherein $R_{21}$–$R_{26}$ individually represent a hydrogen atom or a linear or branched $C_{1-10}$ alkyl, phenyl or $C_{5-6}$ cycloalkyl group; $R_{22}$ and $R_{23}$, $R_{23}$ and $R_{24}$, and $R_{24}$ and $R_{25}$ may be coupled together to form 6-membered aromatic rings, respectively; p and q stand for 0–3, and $X_1$ and $X_2$ represent an —O—, —S— or —NH— group.
* * * * *